United States Patent [19]

Greer, Jr.

[11] Patent Number: 5,003,517

[45] Date of Patent: Mar. 26, 1991

[54] MAGNETOHYDRODYNAMIC FLUID APPARATUS AND METHOD

[75] Inventor: Sedley J. Greer, Jr., North Little Rock, Ark.

[73] Assignee: American Fuel Cell and Coated Fabrics Company, Magnolia, Ark.

[21] Appl. No.: 165,297

[22] Filed: Mar. 8, 1988

Related U.S. Application Data

[63] Continuation-in-part of Ser. No. 850,520, Apr. 11, 1986, Pat. No. 4,764,908.

[51] Int. Cl.$^5$ ............................................. G01V 1/18
[52] U.S. Cl. ................................. 367/178; 367/188; 181/122; 73/652; 324/207.24
[58] Field of Search ............... 367/168, 171, 174, 178, 367/185, 188; 181/122, 401; 324/204, 207; 73/652, 654, 511, 516 R, 516 LM

[56] References Cited

U.S. PATENT DOCUMENTS

| | | | |
|---|---|---|---|
| 2,677,270 | 5/1954 | Sanderson | 367/178 |
| 4,195,280 | 5/1980 | Hillery | 367/171 |
| 4,334,296 | 6/1982 | Hall, Jr. | 367/180 |
| 4,583,207 | 4/1986 | Greer, Jr. | 367/178 |
| 4,764,908 | 8/1988 | Greer, Jr. | 367/178 |

*Primary Examiner*—Brian Steinberger
*Attorney, Agent, or Firm*—Richards, Medlock & Andrews

[57] ABSTRACT

A transducer (700) of great sensitivity is disclosed which incorporates a magnetohydrodynamic (MHD) cell (738) exposed to the flow of a electrically conductive fluid (712) within a channel (704). Flexible diaphragms (722) form the ends of the channel (704) and deflect with the fluid motion. The deflection is sensed by strain gauges (724) and the signals from the MHD cell and strain gauges are processed. In addition, an MHD power generator is contemplated which generates power from a moving electrically conductive fluid, such as sea water in geophysical motion. A strong magnetic field is established normal the direction of fluid flow. Electrodes are positioned normal to both the magnetic field and fluid flow to complete a circuit to transfer the power generated by the movement of the electrically conductive fluid through the magnetic field.

7 Claims, 8 Drawing Sheets

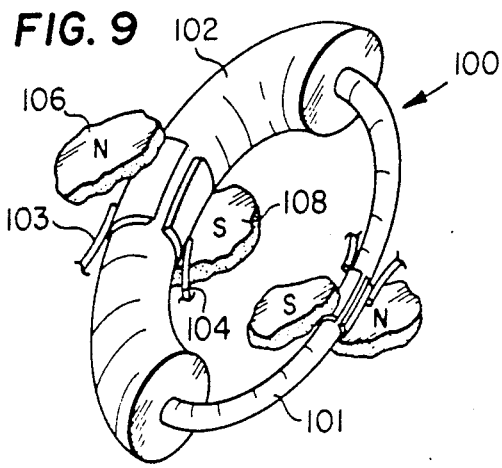
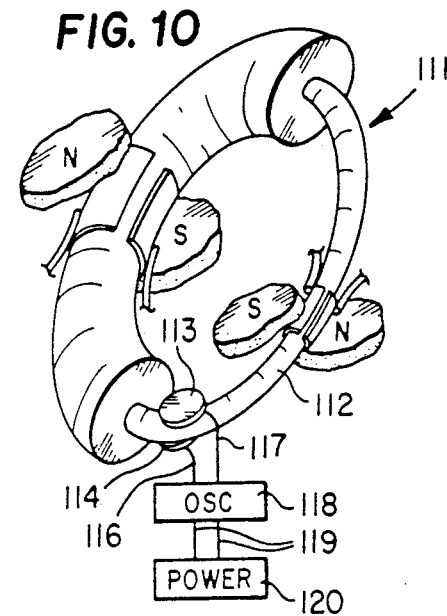
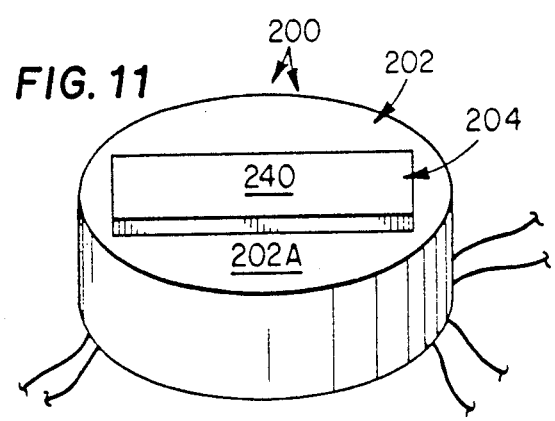
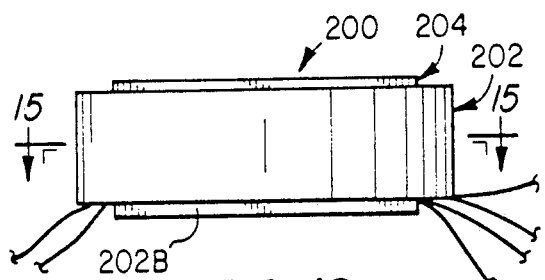
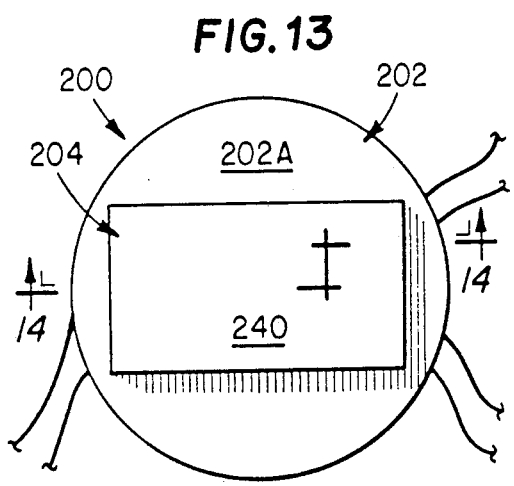
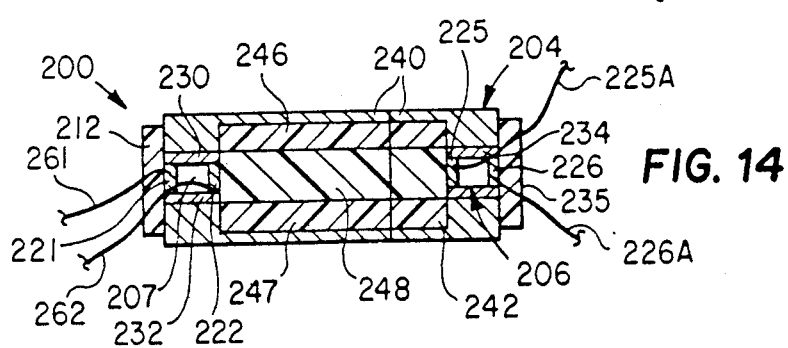

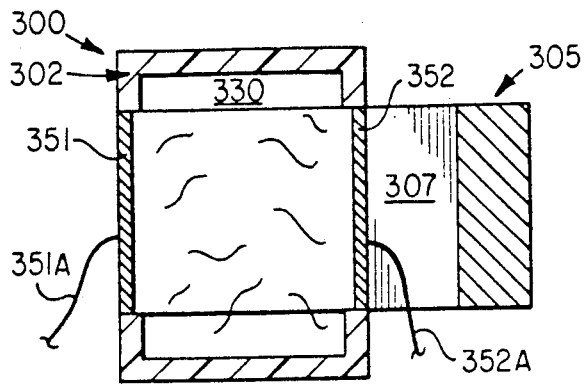
FIG. 20
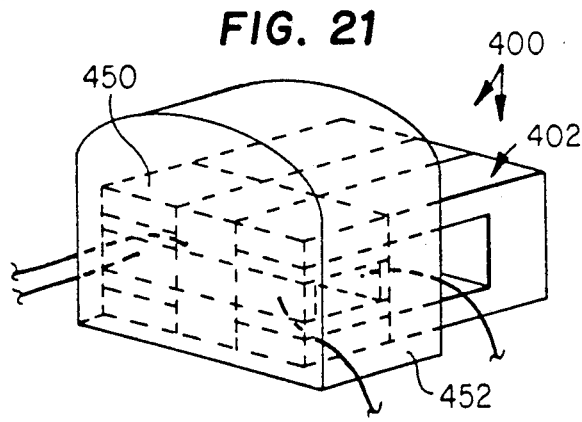
FIG. 21
FIG. 22
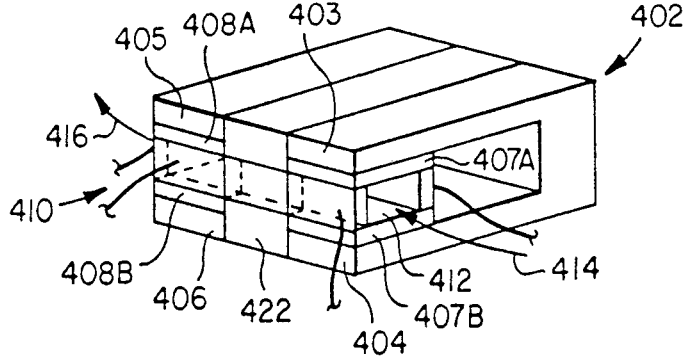
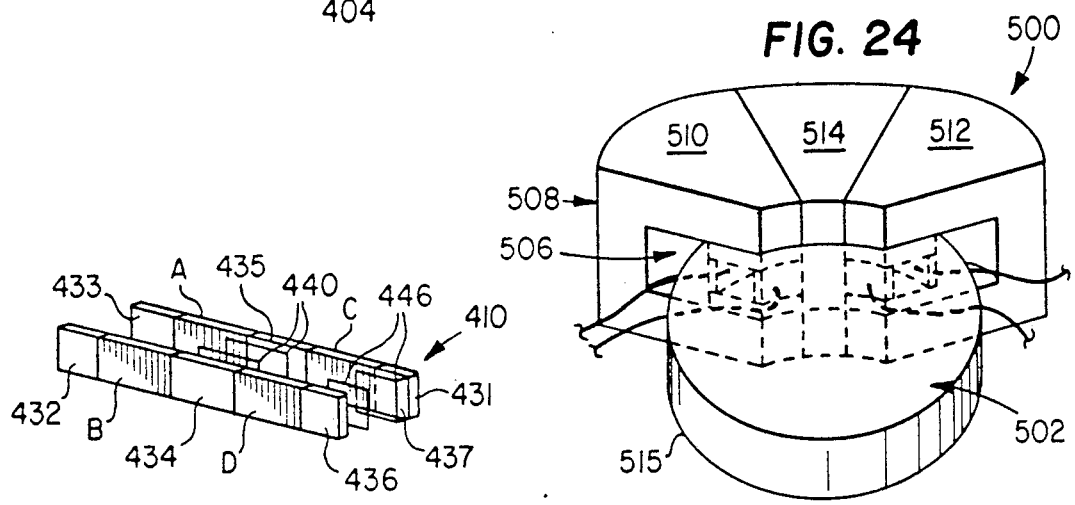
FIG. 23
FIG. 24

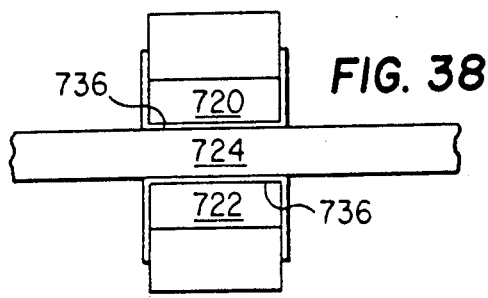
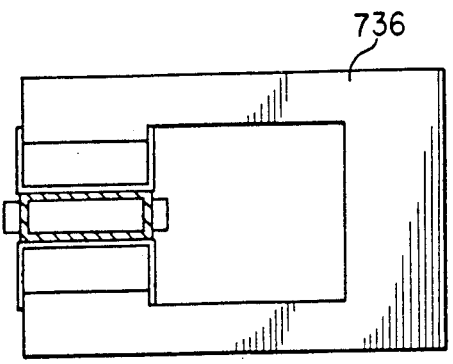
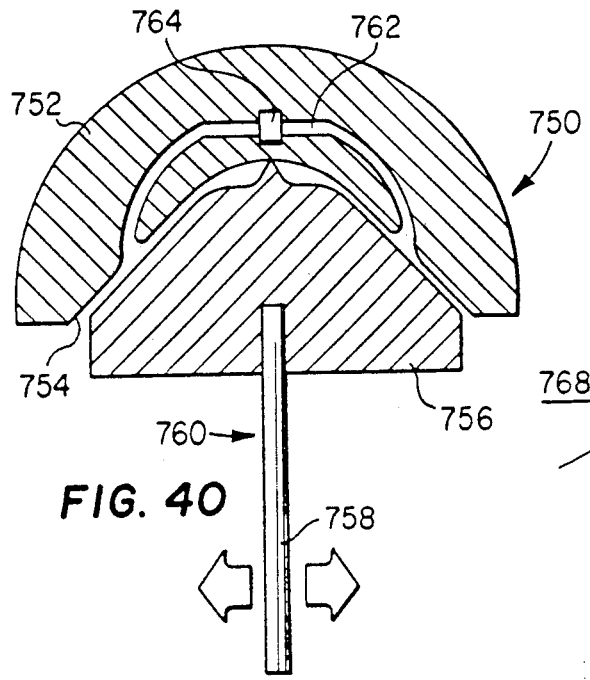
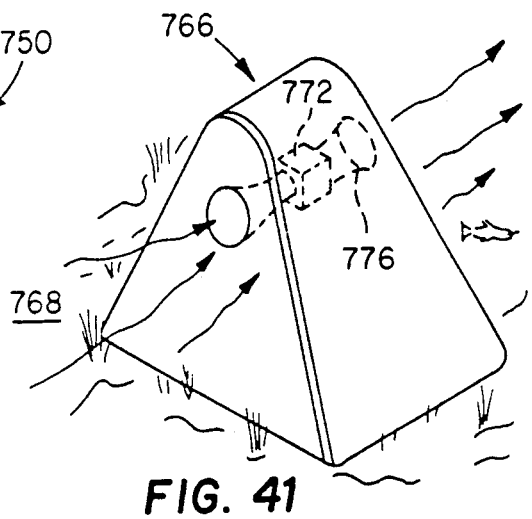
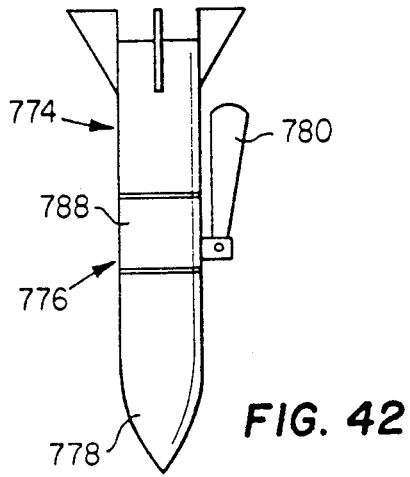
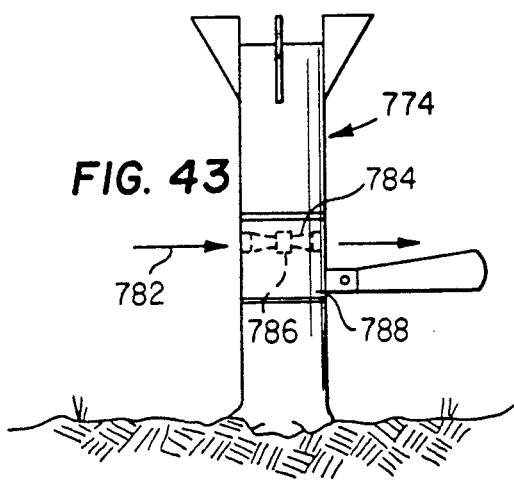

MAGNETOHYDRODYNAMIC FLUID APPARATUS AND METHOD

CROSS REFERENCE TO RELATED APPLICATION

This application is a continuation-in-part of U.S. patent application Ser. No. 850,520, filed Apr. 11, 1986 now U.S. Pat. No. 4,764,908, issued Aug. 16, 1988, for a magnetohydrodynamic fluid transducer.

TECHNICAL FIELD

This invention relates to a motion sensor including a magnetohydrodynamic fluid transducer and fluid displacement sensing structure, as well as to an electrical power generator for generating power through flow of a electrically conductive fluid.

BACKGROUND OF THE INVENTION

The present invention is directed to various magnetohydrodynamic applications. In one aspect, a magnetohydrodynamic fluid transducer is contemplated for sensing perturbations in a electrically conducted fluid. The transducer uses not only a magnetohydrodynamic sensor, but also a fluid displacement sensor, such as a strain gauge, to measure the perturbation in a fluid. This has significant advantages in sensing acceleration rates, and from that the velocity and displacement of a body. In a second aspect, the techniques can be employed for power generation at ambient temperatures from the flow of an electrically conductive fluid, such as seawater.

One example of the employment of a magnetohydrodynamic sensing device would be in seismology. In the prior art, a variety of seismological sensing apparatus have been proposed for monitoring various forms of disturbances or shock waves. The shock waves may be generated in response to earthquakes, tests of nuclear warheads, or from other conventional sources such as the hydraulic vibrators or conventional explosions employed in the oil industry to locate subsurface oil deposits. When an earthquake occurs, a sudden release of accumulated strain results in the propagation of a number of different types of seismological waves. Geophones have previously been employed to measure various parameters associated with earthquakes, such as the velocity of subsurface movement of waves, the rate of change of velocity, and the duration of the event. Shear waves, or S-waves, are the primary signal generated by an earthquake. When an extreme disturbance occurs in a homogeneous environment, a spherical front is generated, and a P-wave results. Such a wave is characterized by alternating compression and rarefaction through the subsurface of the earth, somewhat similar to the structure of sound waves in air. Nuclear blasts in conjunction with underground tests primarily radiate P-waves.

At the interface of the earth with air, Rayleigh waves are generated. Such waves are associated with both earthquakes and underground nuclear tests. Love waves are generated primarily from earthquakes, and are 10 generally transverse to the direction of travel of Rayleigh waves. A wide variety of other complex wave forms resulting from reflection and refraction effects are also known in seismology. A useful discussion of waves, along with recitation of the possibility of monitoring such waves for purposes of policing a total test ban treaty is discussed in *Scientific American*, Vol. 247, No. 4, pages 47-57, October, 1982.

In the prior art, a variety of geophones and/or seismometers have been proposed. Essentially known prior art devices include a rigid, generally conically shaped outer casing or enclosure housing an internal element of some form for sensing vibration. A variety of different sensors and/or transducers have been proposed to originate an electrical signal corresponding to seismological vibration. For example, Hayes in U.S. Pat. No. 1,980,993, discloses a sealed chamber in which pneumatic pressure results in the generation of an electrical signal in response to seismological vibration. Bound in U.S. Pat. No. 3,806,909 employs an internal piezoelectric element sensitive to soil stresses for generating a seismological responsive signal. Massa in U.S. Pat. No. 3,360,772 proposes a geophone in which a bilaminar piezoelectric element is suspended across an interior within the geophone housing for sensing vibrations and producing a proportional electrical signal.

The seismometer proposed by Baltosser in U.S. Pat. No. 2,748,370 contemplates the use of an electromagnetic sensor system interiorly of the casing for producing vibration sensing. Ording in U.S. Pat. Nos. 2,712,124 and 2,759,552 also discloses electromagnetic means for generating a proportional electrical signal. Sanderson in U.S. Pat. No. 2,677,270 senses vibration in response to the differential conductivity within a fluid medium as a gaseous bubble confined within a fluid chamber moves 10 about in response to sudden seismological vibration. Other than less relevant art known to me includes U.S. Pat. Nos. 2,683,867 and 3,474,405.

Seismological sensing technology relates generally to the broader science of perturbation monitoring. Physically shock resistant but sensitive motion sensors somewhat similar to a geophone are of necessity in a wide variety of applications. Thus, velocity meters, accelerometers, and servo motion sensors commonly find usage within geophones, impact gauges, stethoscopes, inertial sensors, inertial guidance systems, vibration measuring systems, hydrophonic sensing instrumentation and the like.

A basic magnetohydrodynamic sensor embodies the capability of being useful in the three major modes of motion sensing (those being displacement meter, velocity meter, and accelerometer), either by direct transducer design or by servo design.

Displacement meters are motion sensors whose natural period of vibration is larger than the period of frequency of perturbation being measured. Such instruments indicate the actual linear displacement magnitude of the perturbation. Velocity meters are motion sensors whose signal output in response to perturbations is in direct proportion to the perturbation behavior characteristics. Such instruments indicate the velocity of the motion being measured. Accelerometers are motion sensors which normally have natural periods of vibration which are shorter in duration than the frequency of incoming perturbations. Such sensors produce signal logic capable of measuring the acceleration of incoming measured perturbations. Velocity meters may be converted into accelerometers by the use of well known differentiator circuits. In the practice of seismology, an earthquake measuring instrumentation platform will commonly have all three types of motion sensors in use so that displacement, velocity, and acceleration can be logged concurrently.

Servo-motion sensors are designed to reduce the influence of mechanical losses during perturbation such as friction and "sloshing" of the working fluid medium inside of the sensors. By utilizing a small segment of electricity produced by the initial flow of the fluid within the device, the sensor mechanism has the capacity to utilize this electricity to trigger a counter-current which stops the flow of the fluid in the tube. In some cases, one can more accurately determine the actual amount of electrical current it takes to stop the flow of the fluid than one can accurately measure the direct flow of the fluid within the tube.

In the trade, velocity meters, accelerometers, and servo-motion sensors commonly find usage in such applications as geophones, seismometers, impact gauges, stethoscopes, inertial sensors as components of mutual guidance systems and various vehicle or vessel-steering or transverse-control systems, rotational motion measuring instruments, vibration measuring instruments, hydrophonic acoustical instruments, and other uses and applications. Servo-sensors are omni-positional and work in the absence of gravitational field, which makes them particularly useful in space.

Many of the sensors described above require some power source. Unfortunately, many applications for these sensors are in remote areas where no external power source is available. While batteries and the like can be used to power the device for a period of time, the period is clearly limited and requires replacement of the power source periodically to maintain the usefulness of the device.

SUMMARY OF THE INVENTION

In accordance with one aspect of the present invention, a magnetohydrodynamic (MHD) fluid transducer for sensing perturbations is provided. The transducer includes structure defining a linear fluid flow channel containing an electrically conductive fluid and extending in a first direction. Magnetic structure is provided for establishing a magnetic field at a first position along the flow channel, with the magnetic field generally perpendicular to the first direction. Structure is provided for sensing the perturbations in the electrical field normal to the magnetic field for monitoring disturbances. The sensing structure includes electrode structure oriented transversely with respect to the magnetic field for sensing the electrical field. Further, the flow channel has first and second ends. The transducer further includes a pressure sensor mounted at each end of the channel and exposed to the fluid for sensing the fluid pressure exerted on each pressure sensor. Structure for processing the signal sensed by the perturbations in the electric field and fluid pressure is provided.

In accordance with other aspects of the present invention, the pressure sensor can include a flexible diaphragm with a strain gauge mounted on the diaphragm to sense the deflection of the diaphragm under the influence of the fluid pressure. The signal processing can include evaluation of the acceleration, velocity and displacement of a body containing the transducer. Three transducers, oriented with the first directions thereof orthogonally extending about three axes can be employed to provide greater sensitivity to movement. Also, the tilt of a transducer relative to gravity field can be sensed in addition to sensing motion.

In accordance with another aspect of the present invention, an electrical power generator is provided for generating electrical power from an electrically conductive fluid flowing in a first direction with a predetermined velocity, the fluid being at ambient temperature. The generator includes magnetic structure for establishing a magnetic field generally normal to the first direction at a first position in the fluid. The generator further includes electrode structure positioned normal to the magnetic field for forming an electrical circuit with the conductive fluid flowing through the magnetic field. Electric power is generated in the conductive fluid as it flows through the magnetic field flowing through the electrode structure.

In accordance with another aspect of the invention, the conductive fluid is salt water which is in motion due to geophysical forces, such as tides and currents. In the salt water environment, the electrode structure is preferably formed of stainless steel presoaked in a salt brine. The generator further can include a body containing the magnetic structure and electrode structure defining a passage therethrough for flow of the conductive fluid. The passage can have a venturi proximate the magnetic structure and electrode structure to enhance power generation. Further, structure can be provided on the body for orienting the body, and passage therethrough, along the first direction to maximize power generation.

BRIEF DESCRIPTION OF THE DRAWINGS

In the following drawings, which form a part of the specification and which are to be construed in conjunction therewith, and in which like reference numerals have been employed throughout whenever possible to indicate like parts in the various views:

FIG. 9 is a pictorial view of an alternative sensor conduit employing reverse magnetohydrodynamic drive;

FIG. 10 is a pictorial view of an alternative conduit employing a fluid vibration system;

FIG. 11 is an isometric view of an angular MHD, continual period velocity sensor-accelerometer constructed in accordance with the preferred invention;

FIG. 12 is a front plan view of the MHD sensor of FIG. 11;

FIG. 13 is a top plan view of the sensor of FIGS. 11 and 12;

FIG. 14 is a sectional view taken generally along lines 14—14 of FIG. 13;

FIG. 20 is a sectional view taken generally along line 20—20 of FIG. 17;

FIG. 21 is a fragmentary isometric view of an alternative MHD, linear servo velocity-accelerometer meter incorporating a twin magnet design, with portions thereof shown in dashed lines for clarity;

FIG. 22 is an enlarged, fragmentary isometric view of the magnet and electrode apparatus of the servo of FIG. 21, with portions thereof shown in section or dashed lines for clarity;

FIG. 23 is a fragmentary isometric view of the electrode structure of the servo of FIGS. 21 and 22;

FIG. 24 is a fragmentary isometric view of an angular MHD servo sensing unit for use as either a velocity meter or an accelerometer, with portions thereof shown in section or dashed lines for clarity;

FIG. 36 is a partial perspective view of one magnetohydrodynamic power generation cell forming another embodiment of the present invention which can generate power from the motion of ocean currents and the like;

FIG. 38 is a side view of the cell;

FIG. 39 is an end view of the cell;

FIG. 40 is a partial cross sectional view of a magnetohydrodynamic power generator forming one embodiment of the present invention;

FIG. 41 is a perspective view of a magnetohydrodynamic power generator forming a second embodiment of the present invention;

FIG. 42 is a side view of a device incorporating a magnetohydrodynamic power generator prior to deployment on a sea bottom; and FIG. 43 is a side view of the device of FIG. 42 deployed with a rudder to direct the device along the direction of fluid flow.

DETAILED DESCRIPTION

Figure 1:
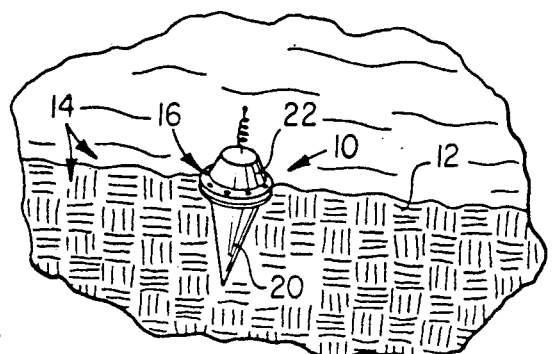
FIG. 1 is a pictorial view illustrating an MHD geophone disposed within an area to be seismologically monitored.
Figure 2:
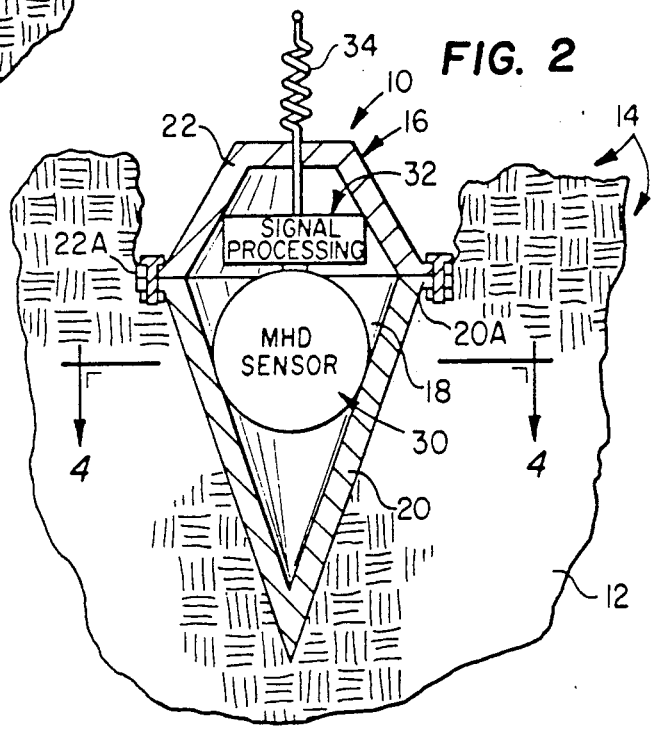
FIG. 2 is an enlarged, fragmentary sectional view of the geophone shown in FIG. 1.
Figure 3:
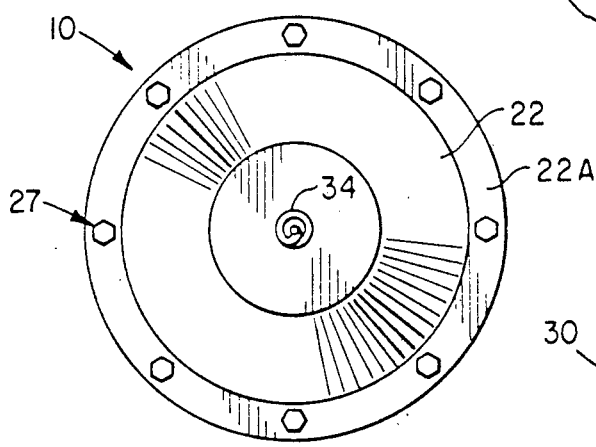
FIG. 3 is a top plan view of the geophone shown in FIGS. 1 and 2.

With initial reference to FIG. 1-3, a geophone 10 is adapted to be firmly embedded within the unconsolidated bedrock 12 within a region 14 requiring seismological monitoring. The geophone 10 includes a rigid, preferably metallic, shock resistance housing 16 having an airtight and watertight, sealed interior 18. Housing 16 is formed from a generally conical bottom 20 which is flangibly coupled to frustrum-like top 22. Thus flange portion 22A is bolted to flange member 20A by a plurality of nut and bolt combinations 27 of conventional configuration. A magnetohydrodynamic sensor, which will be discussed in detail hereinafter, has been generally designated by the reference number 30. Seismological vibrations detected by sensor 30 are amplified and processed by a circuit 32 for transmittal to a remote location through a conventional antenna 34. Although a variety of antennas will be useful, a helical antenna or equivalent is intended for communication with a companion satellite monitor. It is contemplated that standard vertical whip antennas or equivalents may be employed in conjunction with land based UHF or VHF radio monitoring.

Sensor 30 is in the form of a generally spherical body 31 properly machined to admit a generally ring shaped dual diameter tubular conduit, generally designated by the reference numeral 34. As best viewed in FIG. 5, conduit 34 includes a first half generally designated by the reference number 36, having predetermined diameter significantly greater than the diameter of accompanying ring half 38. An electrically conductive fluid such as mercury or a chemical electrolyte 40 is disposed within the conduit 34.

Figure 4:
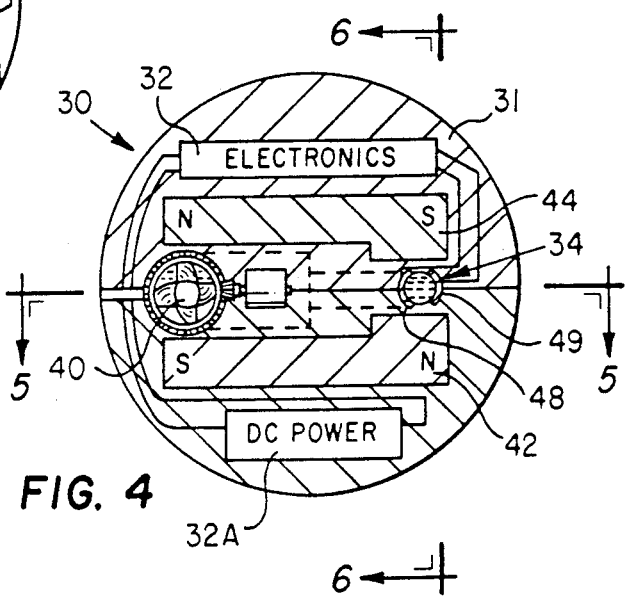
FIG. 4 is an enlarged fragmentary view illustrating the magnetohydrodynamic sensor, taken generally along the line 4—4 of FIG. 2.

A pair of magnets are disposed above and below the conduit 34. As best viewed in FIG. 4, for example, the position of the illustrated north and south poles generate an extremely effective magnetic field across the conduit, and the magnetic field across the conduit, and the magnetic field is perpendicular to the plane occupied by the conduit. Because of the opposed alignment of magnets 42 and 44, the magnetic field vector directed across conduit ring portion 38 will be opposite in direction from the magnetic field directed across larger diameter conduit ring portion 38 will be opposite in direction from the magnetic field directed across larger diameter conduit ring portion 36. As best viewed in FIGS. 4 and 5, the conduit 34 includes at least one pair of electrodes 48, 49 for determining the electric field generated from the magnetohydrodynamics generally normal to the direction of the magnetic field set up by magnets 44 and 42 across the conduit 34. In response to vibration experienced by sensor 30, perturbations in the fluid 40 within conduit 34 are sensed and amplified by circuit 32.

Figure 5:
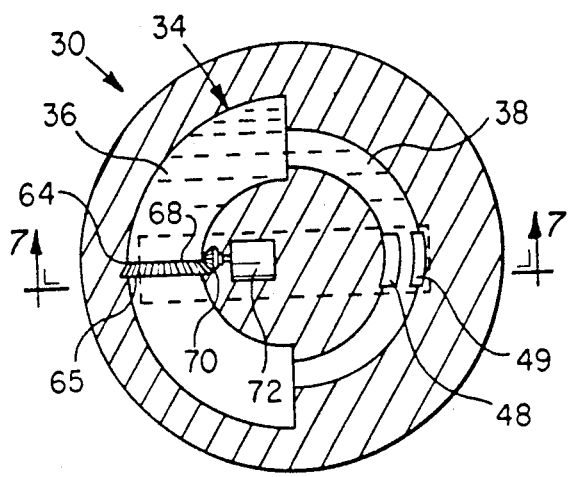
FIG. 5 is a sectional view taken generally along line 5—5 of FIG. 4.
Figure 6:
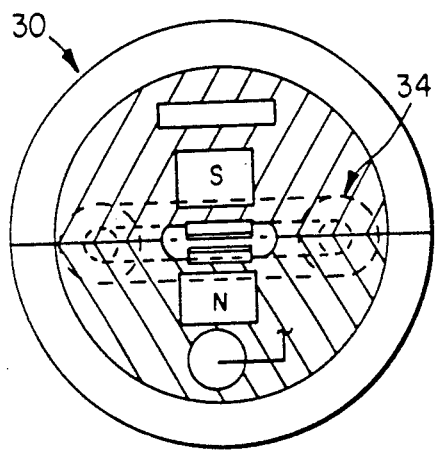
FIG. 6 is a sectional view taken generally along line 6—6 of FIG. 4.
Figure 7:
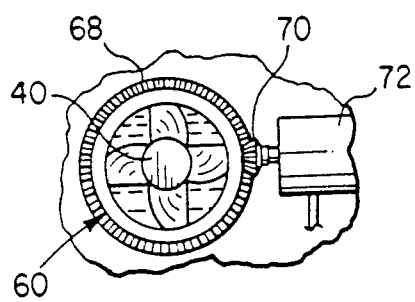
FIG. 7 is an enlarged fragmentary sectional view taken generally along line 7—7 of FIG. 5.

With reference now to FIGS. 5 and 7, means are preferably provided for circulating fluid within the ring shaped conduit 34. Circulation is necessary to enhance the usefulness of the magnetohydrodynamic by providing a fluid current velocity. It is contemplated that a variety of different pumps may be used by the present invention. One such pump which may be employed includes a turbine blade, generally designated by the reference numeral 60 which is rotatably sealed by the mated terminal ends 64, 65 (FIG. 5) of opposite halves of ring larger diameter portion 36. A conventional ring gear 68 driven by worm 70 which is in turn controlled by motor 72 induces fluid motion interiorly of conduit 34. It should be appreciated that because of the larger diameter geometry of ring segment 36 relative to segment 38, a relatively small fluid velocity induced by turbine 60 within conduit portion 36 will be translated into a relatively high velocity in the lower volume ring segment 38 in fluid flow communication with segment 36. Thus the velocity of electrolyte or mercury transmitted through the ring half 38 between electrodes 48 and 49 will be relatively significant in the operating state.

Figure 8:
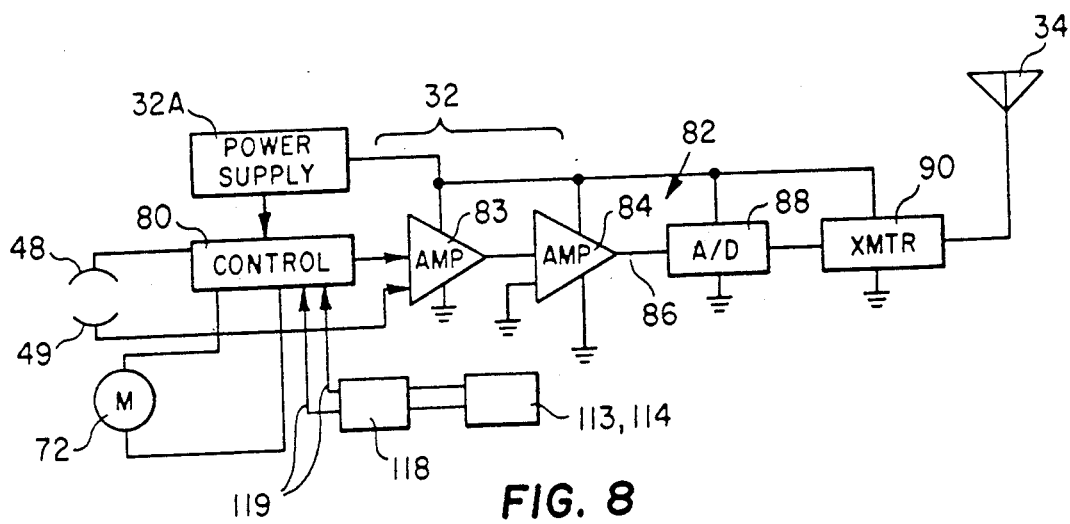
FIG. 8 is an electrical schematic diagram of a preferred control and radio circuit.
Figure 15:
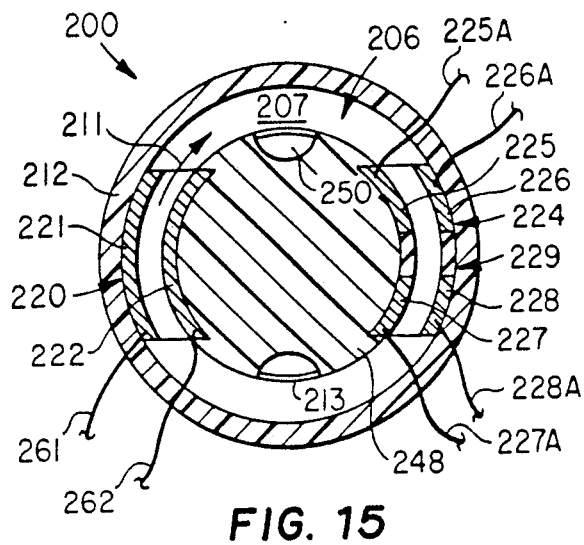
FIG. 15 is a sectional view taken generally along line 15—15 of FIG. 12 in the direction of the arrows.
Figure 16:
FIG. 16 is an isometric view of a linear velocity sensor-accelerometer constructed in accordance with an alternative mode of the improved invention.
Figure 17:
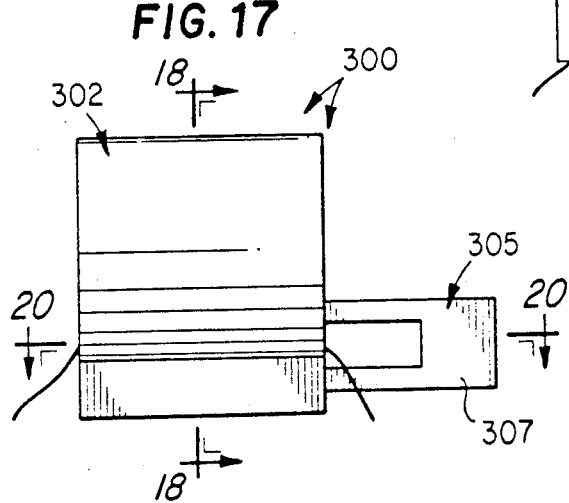
FIG. 17 is a side elevational view of the sensor of FIG. 16, taken from a position generally to the right of FIG. 16.
Figure 18:
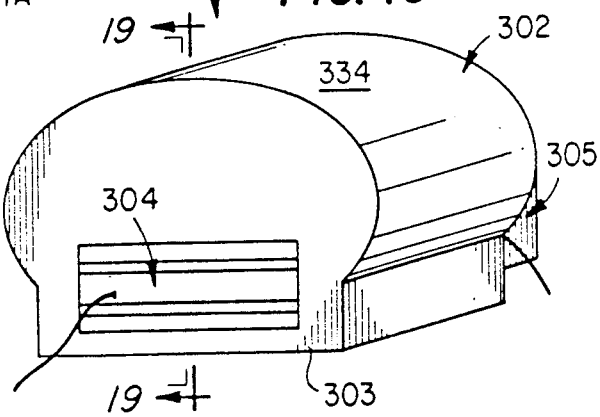
FIG. 18 is a sectional view taken generally along line 18—18 of FIG. 17.
Figure 19:
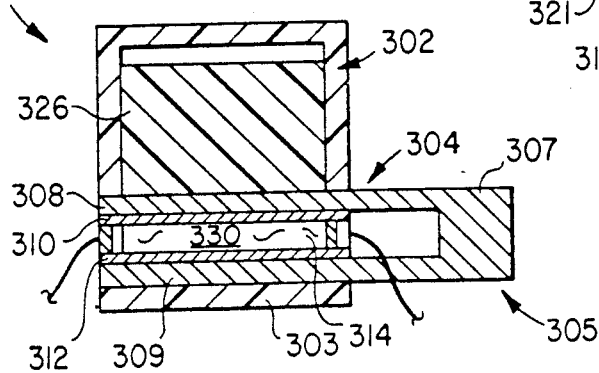
FIG. 19 is a sectional view taken generally along line 19—19 of FIG. 16.

With reference now to FIG. 8, the circuit 32 is of relatively straight forward design. It must be appreciated that a variety of other sensing circuits may be employed with equal utility in conjunction with the MHD system of sensor 30. Circuit 32 includes a conventional battery power supply 32A which operates a conventional control circuit 80 for operating motor 72. Electrodes 48, and 49 transmit their signals through control network 80 to a high gain differential amplifier circuit, generally designated by the reference numeral 82. This circuit includes a pair of operational amplifiers 83, 84 connected in cascade. Their analog output appearing on line 86 is transmitted to a conventional analog-to-digital converter 88 which operates at conventional pulse width modulated transmitter 90 for telemetry output via antenna 34, previously discussed.

An alternative sensing conduit, also generally in the form of a toroid, is designated generally by the reference numeral 100 (FIG. 9). The larger diameter segment 102 includes a pair of electrodes (in electrical communication with the fluid within conduit 100) coupled to leads 103, 104. Magnet poles 106, 108 established a magnetic B field normal to the plane of conduit 100. An electrical voltage applied to lines 103, 104 thus establishes an electric field perpendicular to the magnetic field, and a reverse magnetohydrodynamic effect is established. In other words, a small flow of the electrically conductive fluid is established electrically. Relatively low fluid velocities within conduit segment 102 are translated to higher velocities within conduit segment 101, because of its lower diameter.

In FIG. 10 a further modification of a seismometer is shown. To generate molecular movement of the fluid within conduit 111, a pair of piezoelectric elements 113, 114 are located on opposite sides of the conduit segment 112; leads 116, 117 apply voltage from oscillator 118 across elements 113, 114 to generate vibrations. Power is supplied across lines 119 from source 120.

With reference now directed to FIGS. 11-15, an angular MHD continual period velocity sensor-accelerometer has been generally designated by the reference numeral 200. Sensor 200 functions in the absence of the gravitational field. A generally discshaped body 202 substantially encapsulates a generally rectilinear, centrally disposed magnetic array generally designated by the reference number 204. As best viewed in FIGS. 14 and 15, the body 202 surrounds an inner ring-shaped member 206 defining a generally circular channel 207 through which an electrically conductive fluid may move in response to perturbations as indicated generally by arrow 211.in FIG. 15. Fluid disposed within the channel 207 provided by member 206 may also be forced to move by MHD phenomena to be later described. The channel 207 is defined between an outer periphery 212 and an inner periphery 213 which extend vertically between the top 202A and the bottom 202B of body 202. A pair of drive electrodes generally designated by the reference numeral 220 comprise an outer electrode 221 and an inner electrode 222. A second pair of electrodes, generally designated by the reference numeral 224, include inner electrode 225 and outer electrode 226. Sensing electrodes 227 and 228 are aligned with electrodes 225 and 226 and are maintained in spaced apart relation by a pair of insulators generally designated by the reference numeral 229.

The magnetic structure 204 includes a rare earth magnet 230 spaced apart from a similar magnet 232 and similar magnets 234 and 235. These magnets disposed on opposite sides of the gap are occupied by channel 207. An upper flux distribution bar of generally C-shaped configuration has been designated by the reference numeral 240 and a similar lower bar is designated by the reference numeral 242. These bars are positioned about the covering surfaces 246 and 247 which abut opposite sides of a central plug 248 disposed within ring member 206. A pair of voids generally indicated by the reference numeral 250 are formed on opposite sides of the plug 248 between the plug 248 and the inner periphery 213 of the ring member 206. Preferably a fluid such as nitrogen gas is filled within this gap 250 to provide pressure compensation in response to movement of electrically conducted fluid to be disposed within the channel 207.

Sensor 200 can thus function in cooperation with the geophone as described above or can be employed as a stand-alone sensor unit for the other purposes referenced above. Electrical energization of lines 261, 262 can create a pulse of current which will produce motion of the electrically conductive fluid within channel 207 and the output experienced across electrodes 225 and 226 on lines 225A and 226A can be analyzed through circuits to be hereinafter described to provide motion sensing.

With reference now directed to FIGS. 16-20, an alternative embodiment has been generally designated by the reference numeral 300. Sensor 300 comprises a linear velocity sensor or accelerometer which incorporates the MHD teachings of the present invention. It includes a linear sensing channel for electrically conductive fluid.

Sensor 300 includes a generally mushroom-shaped non-magnetic, preferably plastic, housing 302 which encloses the magnetic array 304, a portion 305 of which projects rearwardly from the rear of the housing 302. The upper portion of the housing 302 is integral with a lower generally rectangular portion generally designated by the reference number 303 which forms a supportive base for the apparatus. This magnetic structure 305 essentially includes a generally C-shaped yoke 307, the parallel ends 308 and 309 of which secure rare earth magnets 310 and 312 above and below a linear channel 314 filled with an electrically conductive fluid 330. As viewed in FIG. 18, channel 314 intercommunicates with a pathway generally indicated by arrows 321 and 322 defined between the body of housing 302 and an inner, upwardly projecting dampening plug 326. Plug 326 is secured internally of housing 302 upon the magnetic array 307 and it includes opposite sides 331 and 332 which converge at a point 333 immediately below the top 334 of the housing 302. As best noted in FIG. 18, the electrically conductive fluid 330 constrained within channel 314 and within that area defined between plug 326 and housing 302 can "slosh" around this pathway in response to strong enough vibration, it can traverse the hollow volume 341 between the top 334 of the housing 302 and the plug point 333. Region 341 is filled with an inert gas such as nitrogen. Plug point 333 may be omitted to increase the volume of the "bubble" of gas 331 and allow it to move more freely.

As best viewed in FIG. 20, a pair of electrodes generally designated by the reference numerals 351 and 352 are disposed on opposite sides of the channel 330 to sense electric fields in a direction normal to both the magnetic field established by the aforementioned construction and the fluid traveling in channel 314. These electrodes include electric lines 351A and 352A for interconnection to circuits to be hereinafter described.

Such a linear velocity sensor or accelerometer 300 would be particularly useful in such applications as impact gauges, electronic stethoscopes, and seismic displacement meters.

With reference now direct to FIGS. 21-23, a linear servo-accelerometer has been generally designated by the reference numeral 400. This accelerometer includes a generally C-shaped magnetic array generally indicated by the reference number 402 which includes two pairs of outwardly projecting magnet support arms. A first pair consists of arms 403 and 404, and the second pair consists of arms 405 and 406.

An electrode assembly generally designated by the reference numeral 410 (FIG. 23) is adapted to be disposed between the gap formed by arms 403, 405 and arms 404, 406 respectively. Arms 403 and 404 secure magnets 407A and 407B. The generally box-like body 431 of the electrode assembly 410 includes a plurality of insulative sections 432–437 which electrically isolate the electrodes A–D. A first pair of baffles 440 are disposed generally between insulated portions 434 and 435. A second pair of baffles 446 emanates from the insulative portion 437 of the electrode assembly 410. These baffles 440 and 446 are employed to encourage laminar flow through the channel between the electrodes. In other words, baffles 440 and 446 encourage the production of fluid turbulence so as to insure linear physical displacement of the conductive fluid in response to vibration of the apparatus.

Arms 405 and 406 secure magnets 408A and 408B. A spacer 421 is disposed between arms 403 and 405 and a cooperating lower spacer 422 is disposed between arms 406 and 404 on opposite sides of the fluid-conductive channel 412. A linear fluid-conductive channel generally designated by the reference numeral 412 permits flow of the electrically-conductive fluid therethrough as referenced by arrows 414 and 416. The electrode assembly includes decelerator electrodes A and B and accelerator electrodes C and D which are disposed so as to sense the electric field normal to both the established magnetic field and the direction of fluid travel.

Fluid traveling as indicated by arrows by 414 and 416 (or fluid traveling in the direction opposite therefrom) is constrained within an interior channel 450 defined within the housing 452 (FIG. 21). Housing 452 may be constructed substantially similarly to housing 302 which is substantially identical thereto. Fluid may travel upwardly within the housing as indicated by arrows 321 and 322 previously discussed. Housing 452 thus cooperates with the linear fluid-conductive channel essentially within the electrode assembly 410.

Sensor 400 is especially useful for inertial sensing in guidance and automatic control systems. The servo-accelerometer allows the designer to reduce the influences of friction, turbulence, sloshing, etc. and thus results in improved accuracy.

Figure 25:
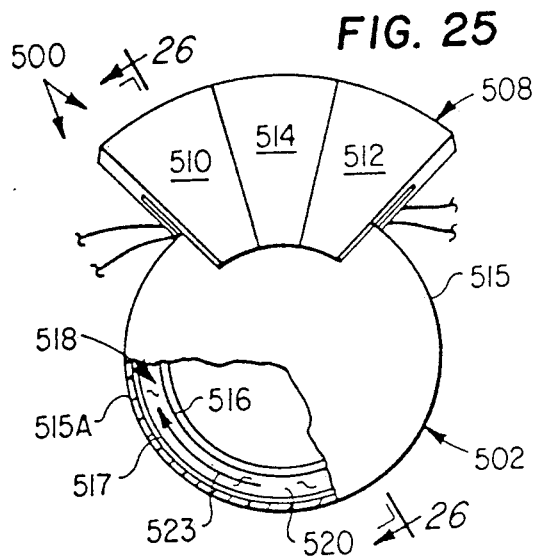
FIG. 25 is a fragmentary top plan view of the servo of FIG. 24.
Figure 26:
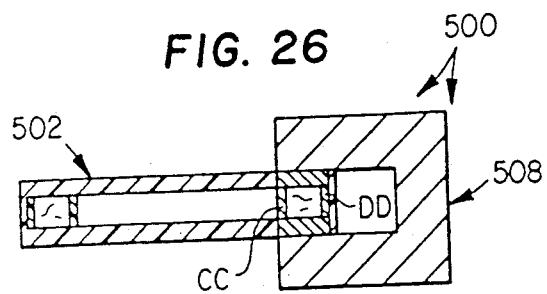
FIG. 26 is a sectional view taken generally along line 26—26 of FIG. 25.

With reference now directed to FIGS. 24-26, an angular servo-accelerometer has been generally designated by the reference numeral 500. It includes a central disc member 502 which functions as an electrode housing and which is positioned within a gap 506 established by the magnetic array 508. Magnetic array 508 and central disc member 502 are operationally secured together within a suitable structurally sound housing which will include a suitable battery power supply along with the electronic circuitry to be hereinafter described. The physical construction of the housing and the internal components will be similar to those of the previously discussed geophone.

Figure 27:
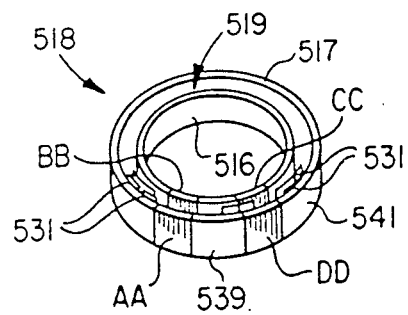
FIG. 27 is an enlarged isometric view of the preferred fluid containment ring and electrode assembly employed with the servo of FIGS. 24-26.

Array 508 includes a pair of generally segment-shaped magnets 510 and 512 separated by a similarly shaped spacer 514. Disc 502 includes a generally circular outer radial periphery 515 comprising an outer wall 515A and an inner guide wall 516 of the electrode assembly 518. An electrode assembly generally designated by the reference numeral 518 includes an outer wall 517 concentrically spaced-apart from its inner wall 516 is concentrically housed within disc 502 and its establishes a channel generally designated by the reference numeral 519 containing electrically-conductive fluid 520 which is free to move within channel 519 as indicated generally by the arrow 523. The electrode assembly 518 includes a pair of spaced-apart accelerator electrodes AA and BB on opposite sides of the channel 519, and a pair of spaced apart, cooperating decelerator electrodes CC and DD. The electrodes are separated by insulative portions of the electrode assembly such as segments 539 and 541. As indicated best in FIG. 27, a plurality of generally arcuate baffles 531 may be disposed at spaced-apart intervals within the channel to reduce turbulence.

Figure 28:
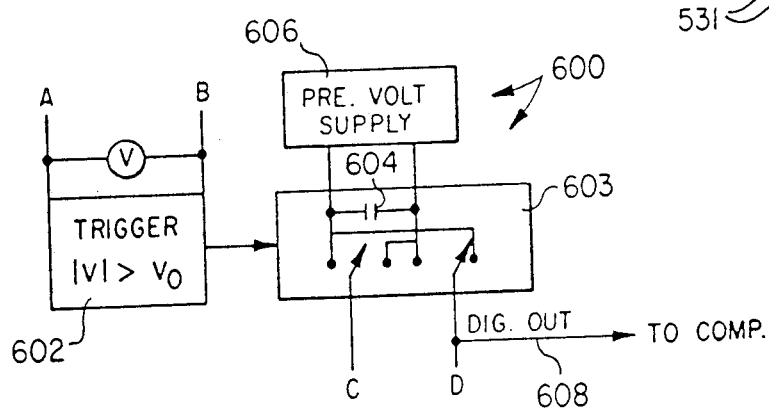
FIG. 28 is a schematic diagram of an optional pulsing circuit for use with the instant invention.

With reference now to FIG. 28, the circuit 600 thereshown includes a trigger circuit 602 responsive to the electrodes A and B (or AA and BB). The trigger 602 is associated with a capacitive discharge circuit 603 which includes a capacitor 604 loaded by a precision voltage supply 606. This circuit is utilized to Null Velocity in the linear or angular accelerometer. Digital pulses are available on line 608 for analysis by an external computer. Preferably three sensors are employed resulting in three pairs of contributing electrodes all of which are connected to circuits similar to circuit 600 so that phase between generating pulses may be discerned. In any event it is to be appreciated that by using two pairs of electrodes in the previously described sensors the voltage may be applied from a first pair and derived from a second pair. In the case when three are applied, as when there are movements in all three orthogonal directions, the sensor apparatus can provide data of the type conventionally processed by computers for position monitoring.

Figure 29:
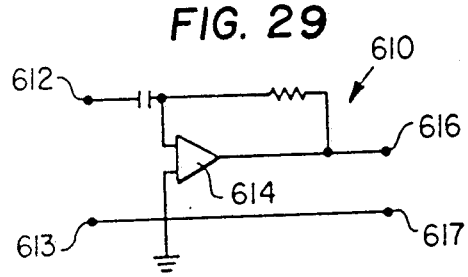
FIG. 29 is a schematic view of a differentiator circuit for use with the present invention to convert motion sensing to velocity sensing.
Figure 30:
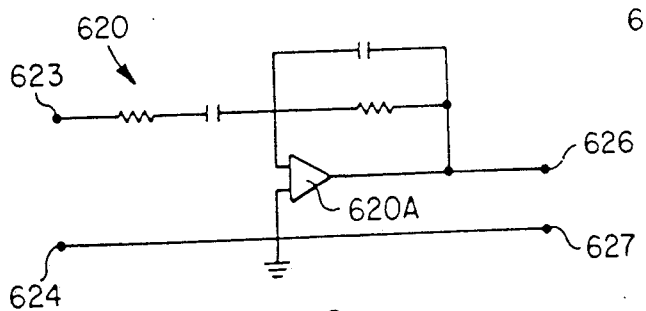
FIG. 30 is a schematic diagram of a circuit for use in deriving acceleration data from sensed motion data.

With reference now to FIGS. 29 and 30, circuit 610 comprises a differentiator circuit which receives an input across nodes 612 and 613 derived from electrodes of the previously described sensors. OP AMP 614 is configured to output the time-based derivative of its input signal appearing on nodes 612 and 613. Thus if position data is imputted across nodes 612 and 613, then velocity data will appear across nodes 616 and 617. Circuit 30 includes an OP AMP 620 adapted to compute the second differential of time-based position data appearing across its nodes 623 and 624. Thus acceleration information is outputted across nodes 626 and 627.

Figure 31:
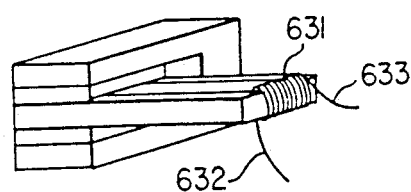
FIG. 31 is a pictorial view illustrating a typical MHD induced voltage sensing coil.

FIG. 31 illustrates that a coil of wire 631 may be disposed about one of the external arms of the magnetic arrays previously discussed. Induced currents in this metallic structure would cause voltage to be generated across lines 632 and 633 which may be delivered to a conventional high-gain amplifier for processing by circuits 610 or 620 as described.

Figure 32:
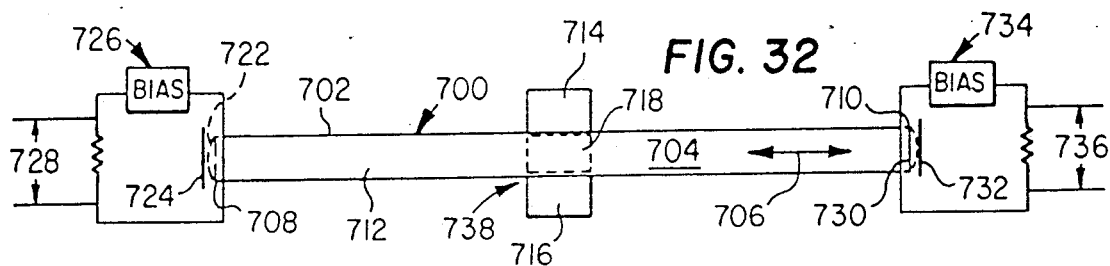
FIG. 32 is a cross sectional view of a fluid transducer incorporating magnetohydrodynamic sensing, and fluid pressure sensing.

With reference now to FIG. 32, a transducer 700 is illustrated. The transducer is positioned within a body 702 which defines a linear fluid flow channel 704 which extends along a first direction 706 between a first end 708 and a second end 710. The channel is filled with an electrically conducted fluid 712, such as a mercury or a chemical electrolyte.

Positioned along the length of the channel 704 is a pair of magnets 714 and 716 which generate a magnetic field generally transverse to the first direction. Positioned normal both to the first direction and the magnetic field are electrodes 718 and 720 (not shown) which are in intimate contact with the fluid 712. The fluid 712, magnets 714 and 716 and electrodes 718 and 720 combine to form MHD cell 738.

At the first end 708 of the transducer 700 is a flexible diaphragm 722 exposed to the fluid 712. When the fluid is at rest, and the first direction horizontal, the diaphragm 722 is essentially planar and perpendicular the first direction as shown in solid line in FIG. 32. If the fluid is in motion to the left, as seen in FIG. 32, the diaphragm will be deflected outwardly, as illustrated in the phantom line. If the fluid is moving in the opposite direction, toward the right in FIG. 32, the diaphragm will deform inwardly. A sensor, preferably a strain gauge 724, is mounted on the exterior surface of the diaphragm 722 and reacts to the deflection of the diaphragm as the fluid moves within the channel 704. The strain gauge 724 forms part of a bias circuit 726 with signal output 728.

At the second end 710 of the channel 704, a flexible diaphragm 730 is mounted which operates in a substantially identical manner to diaphragm 722. A strain gauge 732 is mounted on the exterior surface of the diaphragm 730 and forms part of a bias circuit 734. The bias circuit 734 has signal output 736.

As can be understood, the transducer 700 has three separate motion sensors, including the magnetohydrodynamic cell 738 formed by the magnets 714 and 716 and electrodes 718 and 720, and the strain gauges 724 and 732. As the body 702 containing the transducer 700 moves, the fluid will move relative to the transducer. This motion will be detected as a current induced in the electrodes 718 and 720 by movement of the electrically conductive fluid past the magnet 714 and 716, as well as the deflection of the diaphragms 722 and 732. Preferably, the channel 704 is substantially completely filled with the fluid 712, without gaseous pockets or voids. However, if necessary, the signals can be processed to account for those pockets or voids.

Figure 34:
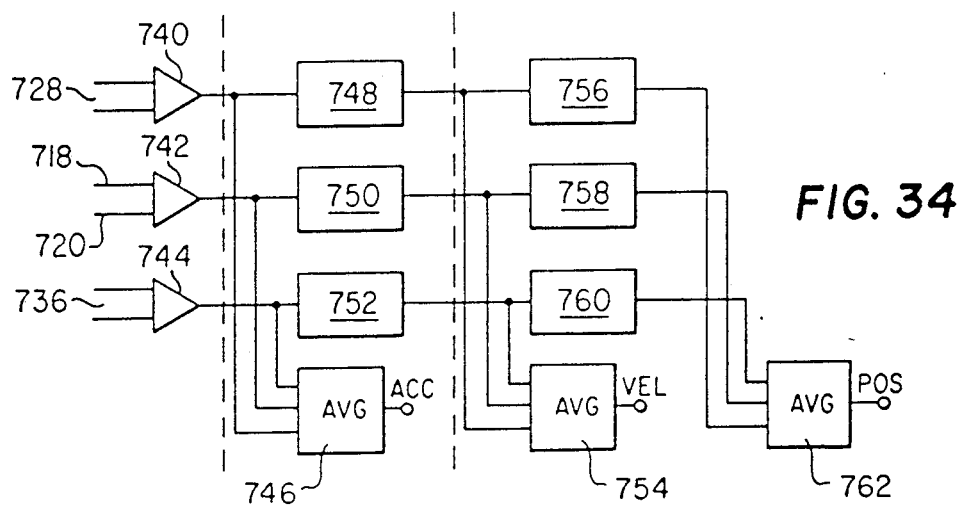
FIG. 34 is a schematic of electronic processor for the signals sensed by the transducer of FIGS. 32 and 33.

Reference is now directed to FIG. 34 which illustrates one electronic circuit that can be used with the transducer 700. As illustrated, the signal from each of the sensors is input into an OP AMP 740, 742 or 744. The output from each of the amplifiers is input to an averaging circuit 746 which outputs the acceleration of the transducer 700, and therefore the body 702 in which the transducer lies.

Each individual signal input from an OP AMP is also provided to an integration circuit 748, 750, 752. There, the signal is integrated with time to result in an output corresponding to velocity of the transducer and body. The output of the integration circuits are fed into an averaging circuit 754 which again averages the three signals to result in a output signal representing velocity.

The output of circuits 748, 750 and 752 are also individually directed into second integration circuits 756, 758 and 760 where they are again integrated with respect to time to result in an output corresponding to position or displacement. The outputs of these circuits are also delivered to an averaging circuit 762 which results in an output for the averaged position.

The design of transducer 700 can be seen to provide significant advantages and accuracy. Three separate sensing environments are employed in a single transducer to provide great resolution. This resolution is further enhanced by employing two different measuring techniques, the magnetohydrodynamic cell, and a displacement sensor.

Figure 33:
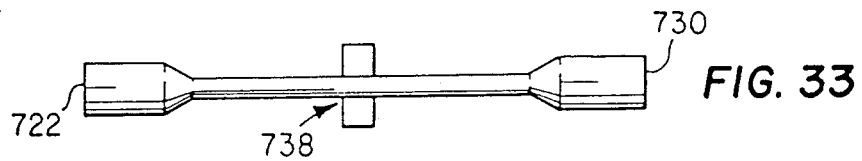
FIG. 33 is a cross sectional view of a first modification of the transducer in FIG. 32 illustrating use of a venturi to enhance sensitivity of the MHD sensor.

Various modifications of the basic transducer 700 are possible. For example, FIG. 33 illustrates a transducer 764 which in virtually all respects is identical to transducer 700. However, the channel through the transducer in the area of the magnetohydrodynamic cell 738 is decreased in cross-sectional area, thereby increasing the velocity of fluid flow pass the cell to increase the sensitivity of the transducer.

Figure 35:
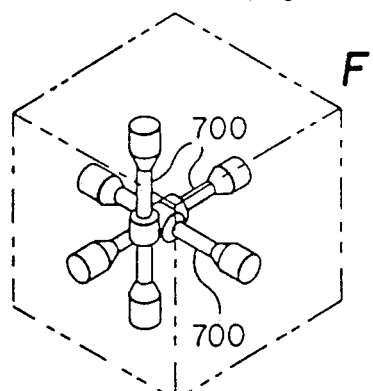
FIG. 35 is a perspective view of a multitransducer array for enhanced detection of movement in three directions.

With reference to FIG. 35, an array of transducers 700 is illustrated to provide multi-axis sensitivity. Of the three transducers, the first direction of each is placed along one axis of a three axis orthogonal coordinate system. The use of three transducers along different axes provides the opportunity for greater sensitivity to multi-axial motion.

With reference now to FIGS. 36-39, one embodiment of an ambient temperature magnetohydrodynamic electrical generator 764 is disclosed. The generator includes a magnetohydrodynamic cell 766 which forms part of a rectangular tube 718 carrying a electrically conductive fluid moving through the tube at a given flow velocity. The cell includes magnets 720 and 722 in intimate contact with the top and bottom surfaces, respectively, of the tube 718. Electrodes 724 and 726 form the sidewalls of the tube between the magnets.

Figure 37:
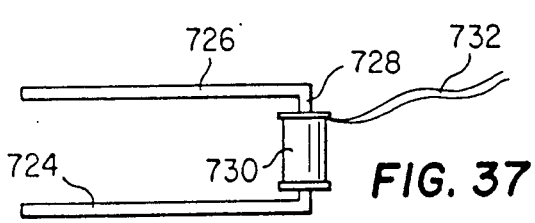
FIG. 37 is a detailed view of the electrode in the cell of FIG. 36.
Figure 36:
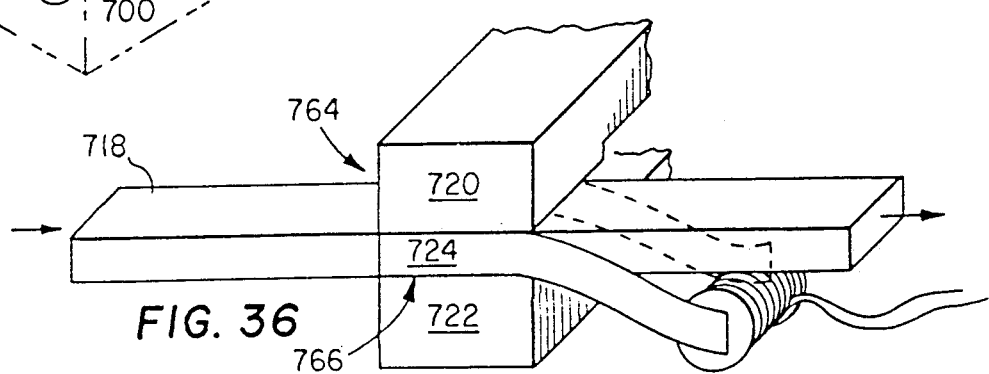

As best seen in FIG. 37, the electrodes are connected through a conductive bridge 728. A coil 730 surrounds the bridge and connects through lines 732 to a power using device, or storage device.

As best seen in FIGS. 38 and 39, the magnets 720 and 722 are mounted in a U-shaped yoke 734 and have insulation 736 along their exposed surfaces. The magnets can comprise permanent rare earth magnets or superconducting magnets as desired.

As the electrically conductive fluid flows through the tube 718, it flows through the magnetic field set up by magnets 720 and 722, current is then induced through the electrodes 724 and 726, and interconnecting bridge 728. The power generated is conveyed to coil 730 by induction, and from the coil to the device requiring power or storing the power. The use of coil 730 allows the electrodes to maintain a low impedance. The basis for the fluid flow can be varied, including geophysical phenomena such as salt water tidal flow, currents and the like, with the flow being at the ambient temperature found in the ocean or sea. Certainly, other flows can be employed independent of the ocean, including, for example, bromine extraction systems found in Southern Arkansas, which brines have an ion concentration of in the order of ten times of that of sea water.

As an illustration, use of a permanent magnet having a 1 mm gap between its poles with a fluid flow velocity of one meter per second, the power output would be approximately 0.5 watts/cu.centimeter of magnetic field volume. For a flow velocity of ten meters per second, the power output would be approximately 50.0 watts/cu.centimeter of magnetic field volume. If superconducting magnets are employed, with a field strength of about ten weber and having a one millimeter gap, flow at one meter per second would generate 9.84 watts/cu.centimeter of magnetic field. Flow at ten meters per second would generate 984 watts/cu.centimeter of magnetic field. In environments where the conductive fluid is salt water, if stainless steel electrodes are employed, it is preferred to presoak the electrodes in salt water for at least about 100 hours prior to inserting them within the MHD cell to condition them.

While a uniform rectangular tube 718 has been illustrated, the conduit for flow of the fluid can have any configuration desired. More specifically, the tube can have a venturi arrangement where the minimum diameter, and hence the greatest flow velocity, occurs at the cell. When used in ocean environments, the generator can be deployed with an anchor or a buoyant float or buoy at the water surface or any other depth.

The electrical generator can be used for a multitude of purposes, including power generation for shore based residential or industrial needs, or as an individual power source for a particular device sited in the ocean. Such devices can include various marine installations such as underwater sensors or submarine communication systems and the like. For conventional power generation to short based needs, the Bay of Fundy tidal flow, and submarine flows east of the Carolinas are promising locations for placement of such generators. Also, such generators can be placed within icebergs to make use of the natural movement of the iceberg within the oceans.

FIG. 40 illustrates a MHD electrical power generator 750 which incorporates the teachings of the present invention. The generator includes a body 752 having a specific gravity slightly greater than that of the fluid within which it rests, such as sea water. The body includes a concave portion 754 on its under side into which is received a float 756. A punka or blade 758 is attached to the float and extends downward into the fluid flow which is flowing in the direction 760. A flow tube 762 is formed in the body 752 and MHD cell 764 is positioned along the tube.

Sideways motions of the punka acts as a pump to drive sea water through the flow tube 762. The flow tube may also have a venturi section at the cell to enhance the fluid velocity. The overall specific gravity of the generator can be adjusted so that the device will either float or remain at a predetermined depth in the sea or ocean.

FIG. 41 illustrates a MHD power generator 766 which is secured to the sea or ocean bottom. The water current flow is along direction 768. A passage 770 is formed through the body of the generator and an MHD cell 772 is positioned within the body along the passage. The passage preferably has a venturi configuration, again with the minimum cross section at the point of the MHD cell.

FIGS. 42 and 43 illustrate a device 774 which incorporates a MHD power generator 776 to provide power to other circuitry within the device. The device has a crushable nose cone 778 and a rudder 780 which can be deployed to orient the device relative to the direction of fluid flow 782. The generator includes a flow tube 784 and MHD cell 786 within a movable section 788 to which the rudder is attached.

In use, the device 774 is released from the surface and falls to the bottom of the ocean or sea. The crushable nose cone 778 is crushed upon impact with the bottom to firmly set the device. The rudder is deployed so that the section 788 rotates relative to the flow direction to maximize the fluid flow through the passage 784. Such a device can be used for underwater communications, and the like.

While several embodiments of the present invention have been illustrated in the accompanying drawings, and described in the foregoing Detailed Description, it will be understood that the invention is not limited to the embodiments disclosed, but is capable of numerous rearrangements, modifications and substitutions of parts and elements with departing from the spirit of the invention.

I claim:

1. A fluid transducer for sensing motion said transducer comprising:
   means defining a linear fluid flow channel containing an electrically conductive fluid, said channel extending in a first direction;
   magnetic means for establishing a magnetic field at a first position along the flow channel, said magnetic field generally perpendicular to said first direction;
   means for sensing perturbations in the electric field normal to the magnetic field for monitoring motion, said sensing means comprising electrode means oriented transversely with respect to said magnetic field for sensing said electrical field; and
   at least one pressure sensor mounted at an end of the channel and exposed to the fluid for sensing the fluid pressure exerted on said pressure sensor.

2. The fluid transducer of claim 1 wherein the channel defines first and second ends, a pressure sensor being mounted at each end of the channel and exposed to the fluid for sensing the fluid pressure exerted on each fluid pressure sensor.

3. The fluid transducer of claim 1 wherein said pressure sensor comprises a flexible diaphragm and a strain gauge mounted on the flexible diaphragm for sensing the deflection of the diaphragm under the influence of the fluid.

4. The fluid transducer of claim 1 further comprising:
   means for processing the perturbations sensed by the electric field sensing means and the pressure sensor to determine fluid motion within the channel.

5. The fluid transducer of claim 1 wherein first, second and third fluid transducers are employed, the first direction of each of said transducers being directed along one axis of a three-axis orthogonal coordinate system.

6. The fluid transducer of claim 1 wherein the channel decreases in cross section at the magnetic field to increase fluid velocity flowing through the magnetic field.

7. The fluid transducer of claim 1 mounted within a body, the perturbations sensed by said electric field sensing means and said pressure sensor being input into means for processing the information sensed to determine acceleration, velocity and displacement of the body.

* * * * *